US012578309B2

(12) United States Patent
Couret et al.

(10) Patent No.: US 12,578,309 B2
(45) Date of Patent: Mar. 17, 2026

(54) METHOD, DEVICE AND PROGRAM FOR DETECTING, BY ULTRASOUND, DEFECTS IN A MATERIAL

(71) Applicant: Electricite de France, Paris (FR)

(72) Inventors: Laura Couret, Levallois-perret (FR); Nicolas Paul, Montreuil (FR)

(73) Assignee: Electricite de France (FR)

( * ) Notice: Subject to any disclaimer, the term of this patent is extended or adjusted under 35 U.S.C. 154(b) by 440 days.

(21) Appl. No.: 18/267,259

(22) PCT Filed: Dec. 16, 2021

(86) PCT No.: PCT/FR2021/052368
§ 371 (c)(1),
(2) Date: Jun. 14, 2023

(87) PCT Pub. No.: WO2022/129805
PCT Pub. Date: Jun. 23, 2022

(65) Prior Publication Data
US 2024/0019402 A1     Jan. 18, 2024

(30) Foreign Application Priority Data

Dec. 17, 2020     (FR) ...................................... 2013483

(51) Int. Cl.
*G01N 29/06*          (2006.01)
*G01N 29/26*          (2006.01)

(52) U.S. Cl.
CPC ....... *G01N 29/0654* (2013.01); *G01N 29/262* (2013.01); *G01N 2291/023* (2013.01);
(Continued)

(58) Field of Classification Search
None
See application file for complete search history.

(56) References Cited

U.S. PATENT DOCUMENTS 8,831,895 B2 *   9/2014   Hedl .................. G01N 29/0645
                                                                 73/594
9,121,810 B2     9/2015   Minonzio et al.
(Continued)

FOREIGN PATENT DOCUMENTS

CN          102481144 A       5/2012
CN          110568084 A       12/2019
(Continued)

OTHER PUBLICATIONS

Pearson, K. F.R.S."LIII. On lines and planes of closest fit to systems of points in space" The London, Edinburgh, and Dublin Philosophical Magazine and Journal of Science, Taylor & Francis, Series 6, Jun. 2010, pp. 1-15.

(Continued)

*Primary Examiner* — Mark R Milia

(74) *Attorney, Agent, or Firm* — Lerner David LLP

(57) ABSTRACT

The present invention relates to a method for detecting, by ultrasound, defects in a material (MS), comprising the steps of transmitting, by M transmitters of index i, and receiving, at sampling times $n \cdot T_e$, by means of M receivers of index j, signals $x(n, i, j)$, forming a sampling matrix $(A_A)$ having N columns $Y_n$ formed by the signals $x(n, i, j)$ for which a distance between the receiver of index j and the transmitter of index i is equal to the deviation $\Delta$ and rows $X_{i,j}$ formed by the signals $x(n, i, j)$, the pair i, j being different from one row $X_{i,j}$ to the next, calculating a covariance matrix (CA) for the projections $X_{i,j}^{proj,k}$ of the rows $X_{i,j}$ of the matrix $(A_A)$ on the K eigenvectors $(V_k)$ corresponding to the K largest
(Continued)

eigenvalues ($\lambda_k$), subtracting, from each row $X_{i,j}$, the K projections $X_{i,j}^{proj,k}$ to obtain residual measurement signals x*(n, i, j) for detecting defects.

17 Claims, 9 Drawing Sheets

(52) U.S. Cl.
CPC ................ *G01N 2291/0289* (2013.01); *G01N 2291/106* (2013.01)

(56) References Cited

U.S. PATENT DOCUMENTS

| | | | |
|---|---|---|---|
| 11,169,120 | B2 | 11/2021 | Kassis et al. |
| 2012/0330570 | A1 | 12/2012 | Hedl et al. |
| 2015/0212051 | A1 | 7/2015 | Bannouf et al. |
| 2017/0328871 | A1 | 11/2017 | Paul et al. |
| 2018/0372688 | A1* | 12/2018 | Stoppiglia ............ G01N 29/069 |
| 2019/0317054 | A1 | 10/2019 | Lopez Villaverde et al. |
| 2019/0380684 | A1 | 12/2019 | Insana et al. |
| 2021/0310991 | A1 | 10/2021 | Kassis et al. |

FOREIGN PATENT DOCUMENTS

| | | | |
|---|---|---|---|
| FR | 3085481 | A1 | 3/2020 |
| JP | H09145694 | A | 6/1997 |
| JP | 2015522175 | A | 8/2015 |
| JP | 2020502518 | A | 1/2020 |
| WO | 2016083759 | A1 | 6/2016 |
| WO | 2020049247 | A1 | 3/2020 |
| WO | 2020128344 | A1 | 6/2020 |

OTHER PUBLICATIONS

Demirli, R et al. : "Ultrasound NDE Imaging through Reverberant Layers via Subspace Analysis and Projection" IEEE International, Ultrasonics Symposium (IUS), Oct. 2012, pp. 1031-1034.
Lopez Villaverde, "Ultrasound imaging in complex materials by focusing at all points: Development of an image denoising method based on the decomposition of the time reversal operator", thesis Paris Diderot, Apr. 2017.169 pgs.
Mickael, N. et al., "Total Focusing Method for Non Destructive Evaluation: Toward Real-Time Imaging Systems" IEEE International, Aug. 2013, pp. 1164-1167.
Sahl B et al., "Some Imaging Strategies in Multi-Angle Spatial Compounding." Center for Arteriosclerosis Detection with Ultrasound (CADUS), IEEE Ultrasonics Symposium, (Oct. 2000), pp. 1615-1618.
Karlis, Dimitris et al. "A Simple Rule for the Selection of Principal Components." Communications in Statistics—Theory and Methods 32 (Jan. 2003): pp. 643-666.
International Search Report for PCT/FR2021/052368 mailed Apr. 12, 2022. 3 pages.
French Search Report for Application No. FR 2013483 completed Sep. 2, 2021. 2 pages. (see p. 1, categorizing the cited references).
Search Report dated Dec. 17, 2025 from the Office Action for Chinese Application No. 202180094051.3 issued Dec. 18, 2025, pp. 1-2.

* cited by examiner

Evolution of the SNR as a function of
the number of components K

C1 : Signals x

C2 : Signals x*

C3 : Signals x* with bilateral filtering

1

METHOD, DEVICE AND PROGRAM FOR DETECTING, BY ULTRASOUND, DEFECTS IN A MATERIAL

CROSS-REFERENCE TO RELATED APPLICATIONS

The present application is a national phase entry under 35 U.S.C. § 371 of International Application No. PCT/FR2021/052368 filed Dec. 16, 2021, which claims priority from French Application No. 2013483 filed Dec. 17, 2020, all of which are hereby incorporated herein by reference.

The invention relates to a method and a device for detecting, by ultrasound, defects in a material.

The field of the invention relates to the non-destructive detecting of defects by ultrasound, which can be used on the molded products of the primary circuits of a nuclear power plants, but can also be applied to other components of the nuclear fleet and to other industrial sectors such as aeronautics or naval.

The present invention advantageously applies to complex materials. By complex material it is meant any type of material generating spurious signals that may mask the detection of defects.

In order to detect potential defects in the material, a common method consists in applying against a surface of the material a multi-element ultrasonic probe, comprising transducers, which are put alternately in emitting mode and in receiving mode of the ultrasonic measurement signals propagating in the material.

The spurious signal can for example correspond to the lateral waves or to the near-surface waves which can substantially interfere with the detection of defects in the first millimeters of depth of the material. This area of the first millimeters of depth under the surface of the material is sometimes considered as a dead area because the possible defects which are present there may be masked by the ambient noise. This spurious signal can also correspond for example to the structural noise, this noise resulting from a heterogeneous microstructure of the material. When the wavelength of the ultrasonic waves emitted by the probe is close to the average diameter of the grains of the material, this noise is particularly disturbing for the analysis of the acquisitions, in particular when this noise is higher than the level of the signal reflected by a potential defect.

The invention seeks to reduce or eliminate the influence of noise in the acquisitions of the measurement signals.

A known method for processing this type of ultrasonic measurement signals is the method called focusing on every point or Total Focusing Method (TFM). This method produces for each position of the probe an image corresponding to a cross-section of the material under the probe. The presence of spurious noise (near-surface waves, structural noise) greatly deteriorates the quality of these images, thus compromising the correct detection of the potential defects in the material.

Without possible post-processing on the TFM, the noise generated by the surface waves and/or by the heterogeneity of the microstructure can be so important that it makes the detection of defects difficult or even impossible in some cases, especially at low depth.

The spurious noise observed on the images resulting from the TFM presents a spatial inhomogeneity: it varies substantially according to the location of the points. Particularly, it tends to be higher in the vicinity of the emitter/receiver array (effect of the surface waves).

Document FR-A-3085481 discloses a method for detecting and characterizing, by ultrasound, defects in a heterogeneous material, providing for post-processing the image obtained, for example by the TFM method, using the following statistics: a measurement of the central tendency of the amplitude focused at the level of the probed point on different probe positions, a measurement of the function representative of the variability of the amplitude focused at the level of the probed point on different probe positions. Another focusing method taught by the document FR-A-3085481 is the Plane Wave Imaging method, referred to as PWI, where the different configurations are distinguished from each other by different delays applied to the emission of ultrasonic waves by the emitting transducers by exciting all the transducers uni-sequentially.

However, these statistics used in the method known from document FR-A-3085481 assume that there are healthy areas (free of defects) in the image, so that these healthy areas can be learned beforehand to constitute representative areas or reference areas of the inspected material. These measurements will then make it possible to normalize the noise and identify any amplitude gaps synonymous with a defect. The statistics made on the healthy areas correspond to a learning phase of the studied material. This learning phase can only be carried out if healthy and representative areas are available, serving as reference areas. In the absence of such healthy and representative areas, serving as reference areas, it would be necessary to implement a step prior to the operation of the method of document FR-A-3085481, and therefore to organize additional tests, which increases the overall duration of the measurements.

One goal of the present invention is to provide a method and a device for detecting, by ultrasound, defects in a material, that overcome the drawbacks mentioned above and dispense with such a reference area when it is not available.

To this end, a first subject matter of the invention is a method for detecting, by ultrasound, defects in a material, characterized in that the method comprises the following steps:

a) successively emitting ultrasound against a surface of the material by M emitting ultrasonic transducers of index i of a multi-element probe, where i is a first natural integer going from 1 to M and where M is a second prescribed natural integer greater than or equal to 2, receiving, at sampling instants $n \cdot T_e$ by M receiving ultrasonic transducers of index j of the multi-element probe, measurement signals $x(n, i, j)$ which are representative of the amplitude of the ultrasounds propagated in the material, where n is a third natural integer going from 1 to N, where N is a fourth prescribed natural integer greater than or equal to 2, where $T_e$ is a prescribed sampling period and where j is a fifth natural integer going from 1 to M, b) forming by a calculator, for at least one prescribed gap $\Delta$, which is positive or zero, a sampling matrix, having N columns $Y_n$, the N columns $Y_n$, for n going from 1 to N, being formed by all the measurement signals $x(n, i, j)$ and corresponding to the N sampling instants $n \cdot T_e$, each column $Y_n$ having for the sampling instant $n \cdot T_e$ all the measurement signals $x(n, i, j)$ for which a distance between the receiving ultrasonic transducer of index j and the emitting ultrasonic transducer of index i is equal to the prescribed gap $\Delta$, which is identical for the N columns $Y_n$, the sampling matrix having rows $X_{i,j}$ formed by the all the measurement signals x(n, i, j), for which the index i is identical in each row $X_{i,j}$ and the index j is identical in each row $X_{i,j}$, the pair i, j being different from one row $X_{i,j}$ to another, c) calculating by the calculator a covariance matrix from the sampling matrix, the covariance matrix being a square and symmetrical matrix of dimension N×N, d) calculating by the calculator p eigenvectors and p eigenvalues associated with the eigenvectors for the covariance matrix, where p is a sixth prescribed natural integer, greater than or equal to 2 and is a prescribed maximum number of calculated eigenvectors and of calculated eigenvalues, less than or equal to N, e) calculating by the calculator projections $X_{i,j}{}^{proj,k}$ of the rows $X_{i,j}$ of the sampling matrix on the K eigenvectors corresponding to the K largest eigenvalues, where K is a selected number smaller than the maximum number p of calculated eigenvectors and of calculated eigenvalues, f) subtracting by the calculator from each of the rows $X_{i,j}$ of the sampling matrix the projections $X_{i,j}{}^{proj,k}$ of this row $X_{i,j}$ on the K eigenvectors, to obtain residual defect detection rows $X^*_{i,j}$ formed by a set of residual defect detection measurement signals x*(n, i, j), for which the index i is identical in each residual defect detection row $X^*_{i,j}$ and the index j is identical in each residual defect detection row $X^*_{i,j}$, the pair i, j being different from one residual defect detection row $X^*_{i,j}$ to another.

Thanks to the invention, the spurious signals in which the possible defects of the inspected material were embedded are attenuated or eliminated, which makes it possible to better detect these defects. Thus, the invention does not require the learning phase taught by document FR-A-3085481.

Embodiments of the invention are described below, which can be applied to the method for detecting, by ultrasound, defects according to the invention, to the device for detecting, by ultrasound, defects according to the invention and to the computer program for detecting, by ultrasound, defects according to the invention.

According to one embodiment of the invention, M is a second prescribed natural integer greater than or equal to 3.

According to one embodiment of the invention, e) calculating by the calculator the projections $X_{i,j}{}^{proj,k}$, for k going from 1 to K, of the rows $X_{i,j}$ of the sampling matrix on the K eigenvectors corresponding to the K largest eigenvalues, where K is a selected number smaller than the maximum number p of calculated eigenvectors and calculated eigenvalues, where k is a seventh natural integer going from 1 to K, f) subtracting by the calculator from each of the rows $X_{i,j}$ of the sampling matrix the K projections $X_{i,j}{}^{proj,k}$, for k going from 1 to K, of this row $X_{i,j}$, to obtain residual defect detection rows $X^*_{i,j}$ formed by a set of residual defect detection measurement signals x*(n, i, j), for which the index i is identical in each residual defect detection row $X^*_{i,j}$ and the index j is identical in each residual defect detection row $X^*_{i,j}$, the pair i, j being different from one residual defect detection row $X^*_{i,j}$ to another.

According to one embodiment of the invention, the method further comprises the following step:

g) carrying out by the calculator a post-processing for detecting defects in the material from the residual defect detection measurement signals x*(n, i, j).

According to one embodiment of the invention, the post-processing for detecting defects comprises an algorithm for focusing on the residual defect detection measurement signals x*(n, i, j) to generate an image.

According to one embodiment of the invention, the algorithm for focusing is a focusing algorithm for focusing on every point, the focusing algorithm for focusing on every point comprising a step of calculating by the calculator an indicator I*(w) for probed positions w in a cross-section of the material (MS) as follows:

$$I^*(w) = \sum_{i=1}^{M}\sum_{j=1}^{M} x^*(t(w, i, j), i, j)$$

where t(w, i, j) corresponds to a travel time for a signal, which was emitted by the emitting ultrasonic transducer of index i, which was reflected at the probed position w and which was received by the receiving ultrasonic transducer of index j, where t(w, i, j) corresponds to one of the sampling instants $n \cdot T_e$ and where n is calculated between 1 and N, and a step of forming, by the calculator, the image, for which the probed positions w correspond to positions of pixels of the image (I*), the value of the pixels of the image at the positions w being equal to the indicator I*(w).

According to one embodiment of the invention, the focusing algorithm is a focusing algorithm for focusing on every point, the focusing algorithm for focusing on every point comprising a step of calculating by the calculator (CAL) an indicator I*(w) for probed positions w in a cross-section of the material (MS) as follows:

$$I^*(w) = \sum_{i=1}^{M}\sum_{j=1}^{M} g(x^*(t(w, i, j), i, j))$$

where t(w, i, j) corresponds to a travel time for a signal, which was emitted by the emitting ultrasonic transducer of index i, which was reflected at the probed position w and which was received by the receiving ultrasonic transducer of index j, where t(w, i, j) corresponds to one of the sampling instants $n \cdot T_e$ and where n is calculated between 1 and N, and a step of forming, by the calculator, the image, for which the probed positions w correspond to positions of pixels of the image, the value of the pixels of the image at the positions w being equal to the indicator I*(w) and where g is a prescribed function.

According to one embodiment of the invention, the method further comprises the following step:

h) carrying out by the calculator a bilateral filtering of the image.

According to one embodiment of the invention, calculating by the calculator the integer K, for which $\lambda_K > m+2s$ and $\lambda_{K+1} \leq m+2s$, where $(\lambda_k)_{1 \leq k \leq N}$ denotes the eigenvalues for a seventh natural number k going from 1 to N, m is the average of the N eigenvalues $(\lambda_k)_{1 \leq k \leq N}$, s is the standard deviation of the N eigenvalues $(\lambda_k)_{1 \leq k \leq N}$.

According to one embodiment of the invention, the M emitting ultrasonic transducers of index i and the M receiving ultrasonic transducers of index j are evenly distributed with respect to the surface of the material.

According to one embodiment of the invention, the M emitting ultrasonic transducers of index i form part respectively of M ultrasound emitting-receiving units located in respectively M distinct prescribed positions in the multi-element probe, and the M receiving ultrasonic transducers of index j form part respectively of the M ultrasound emitting-receiving units.

According to one embodiment of the invention, the M emitting ultrasonic transducers of index i and the M receiving ultrasonic transducers of index j are distributed in a plane.

According to one embodiment of the invention, the M emitting ultrasonic transducers of index i and the M receiving ultrasonic transducers of index j are distributed along at least one rectilinear axis.

According to one embodiment of the invention, calculating by the calculator the residual defect detection measurement signals $x^*(n, i, j)$ for several prescribed gaps $\Delta$, which are different from each other.

According to one embodiment of the invention, calculating by the calculator the residual defect detection measurement signals $x^*(n, i, j)$ for the prescribed gaps $\Delta$ corresponding to all the combinations of the M emitting ultrasonic transducers of indices i with the M receiving ultrasonic transducers of indices j.

According to one embodiment of the invention, the M emitting ultrasonic transducers of index i of the multi-element probe coincide with the M receiving ultrasonic transducers of index j of the multi-element probe.

According to another embodiment of the invention, the M emitting ultrasonic transducers of index i of the multi-element probe are distinct from the M receiving ultrasonic transducers of index j of the multi-element probe.

A second subject matter of the invention is a device device for detecting, by ultrasound, defects in a material, characterized in that the device comprises:

a multi-element probe, comprising M emitting ultrasonic transducers of index i, able to successively emit ultrasounds against a surface of the material, where i is a first natural integer going from 1 to M and where M is a second prescribed natural integer greater than or equal to 2, the multi-element probe comprising M receiving ultrasonic transducers of index j, able to receive, at sampling instants $n \cdot T_e$, measurement signals $x(n, i, j)$ which are representative of the amplitude of the ultrasounds propagated in the material, where n is a third natural integer going from 1 to N, where N is a fourth prescribed natural integer greater than or equal to 2, where $T_e$ is a prescribed sampling period and where j is a fifth natural integer going from 1 to M, the device comprising a calculator, which is configured to:

form for at least one prescribed gap $\Delta$, which is positive or zero, a sampling matrix, having N columns $Y_n$, the N columns $Y_n$, for n going from 1 to N, being formed by all the measurement signals $x(n, i, j)$ and corresponding to the N sampling instants $n \cdot T_e$, each column $Y_n$ having for the sampling instant $n \cdot T_e$ all the measurement signals $x(n, i, j)$ for which a distance between the receiving ultrasonic transducer of index j and the emitting ultrasonic transducer of index i is equal to the prescribed gap $\Delta$, which is identical for the N columns $Y_n$, the sampling matrix having rows $X_{i,j}$ formed by all the measurement signals $x(n, i, j)$, for which the index i is identical in each row $X_{i,j}$ and the index j is identical in each row $X_{i,j}$, the pair i, j being different from one row $X_{i,j}$ to another, calculate a covariance matrix from the sampling matrix, the covariance matrix being a square and symmetrical matrix of dimension N×N, calculate p eigenvectors and p eigenvalues associated with the eigenvectors for the covariance matrix, where p is a sixth prescribed natural integer, greater than or equal to 2 and is a prescribed maximum number of calculated eigenvectors and of calculated eigenvalues, less than or equal to N, calculate projections $X_{i,j}^{proj,k}$ of the rows $X_{i,j}$ of the sampling matrix on the K eigenvectors corresponding to the K largest eigenvalues, where K is a selected number smaller than the maximum number p of calculated eigenvectors and of calculated eigenvalues, subtract from each of the rows $X_{i,j}$ of the sampling matrix the projections $X_{i,j}^{proj,k}$ of this row $X_{i,j}$ on the K eigenvectors, to obtain residual defect detection rows $X^*_{i,j}$ formed by a set of residual defect detection measurement signals $x^*(n, i, j)$, for which the index i is identical in each residual defect detection row $X^*_{i,j}$ and the index j is identical in each residual defect detection row $X^*_{i,j}$, the pair i, j being different from one residual defect detection row $X^*_{i,j}$ to another.

According to one embodiment of the invention, a calculator, which is configured to:

calculate the projections $X_{i,j}^{proj,k}$, for k going from 1 to K, of the rows $X_{i,j}$ of the sampling matrix over the K eigenvectors corresponding to the K largest eigenvalues, where K is a selected number smaller than the maximum number p of calculated eigenvectors and calculated eigenvalues, where k is a seventh natural integer going from 1 to K, subtract from each of the rows $X_{i,j}$ of the sampling matrix the K projections $X_{i,j}^{proj,k}$, for k going from 1 to K, of this row $X_{i,j}$, to obtain residual defect detection rows $X^*_{i,j}$ formed by a set of residual defect detection measurement signals $x^*(n, i, j)$, for which the index i is identical in each residual defect detection row $X^*_{i,j}$ and the index j is identical in each residual defect detection row $X^*_{i,j}$, the pair i, j being different from one residual defect detection row $X^*_{i,j}$ to another.

A third subject matter of the invention is a computer program for detecting defects by ultrasound, comprising code instructions for the implementation of the method for detecting defects by ultrasound as described above, when executed by a calculator.

The invention will be better understood upon reading the following description, given only by way of non-limiting example with reference to the figures below of the appended drawings.

Figure 1:
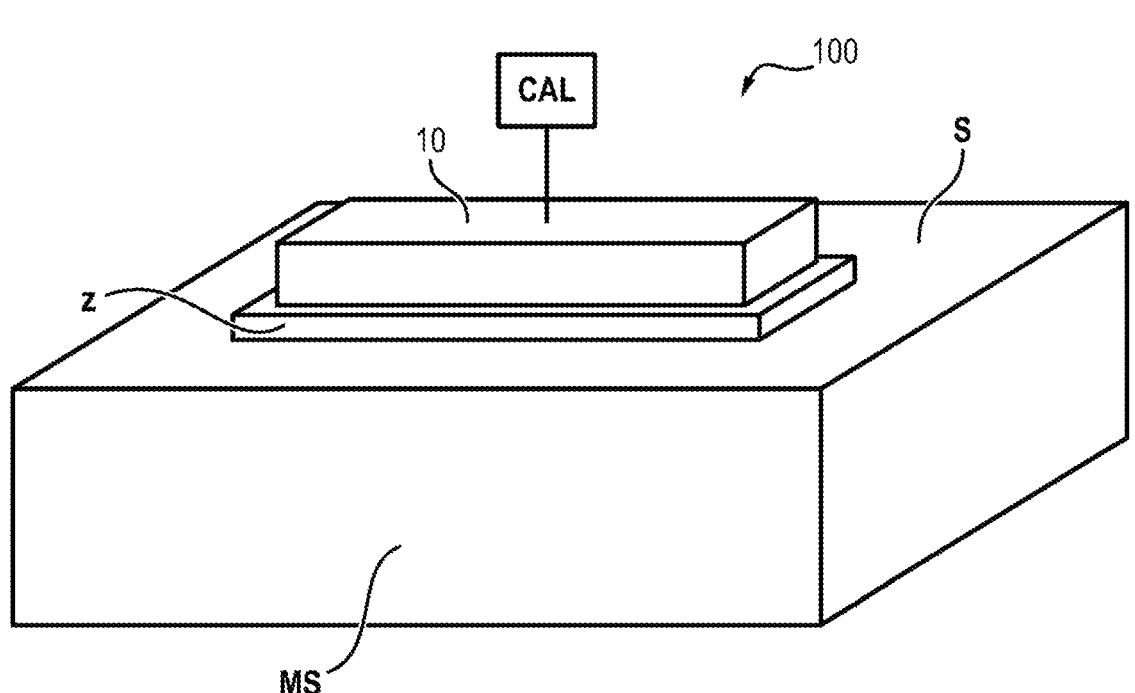
FIG. 1 represents a schematic perspective view of a device for detecting defects by ultrasound according to one embodiment of the invention.

The method for detecting defects by ultrasound, the device 100 for detecting defects by ultrasound and the computer program implementing this method are described below with reference to FIGS. 1 to 5. The device 100 for detecting defects comprises a multi-element probe 10, comprising ultrasonic transducers 14, 15 which can be emitters and/or receivers of ultrasounds. The steps of the method for detecting defects by ultrasound are described with reference to FIG. 5. During a first step E1, the multi-element probe 10 is disposed at a certain position z on the surface S of the material MS to be inspected. For example, the multi-element probe 10 can comprise a coupling medium located between the surface S of the material MS to be inspected and the ultrasonic transducers 14, 15, to allow the propagation of the ultrasounds between the surface S of the material MS to be inspected and the ultrasonic transducers 14, 15. In one embodiment of the invention, this coupling medium can form an integral part of the multi-element probe 10 and be secured to the ultrasonic transducers 14, 15 and can comprise for example a gel contained in a container secured to the ultrasonic transducers 14, 15, the multi-element probe 10 being against or in contact with the surface S of the material MS to be inspected in this case. In another embodiment of the invention, this coupling medium is not an integral part of the multi-element probe 10 and is not secured to the ultrasonic transducers 14, 15 and can be added between the surface S of the material MS to be inspected and the ultrasonic transducers 14, 15, this coupling medium can be for example a height of water present between the surface S of the material MS to be inspected and the ultrasonic transducers 14, 15, for example in the case where the material MS and the multi-element probe 10 are immersed in water, the multi-element probe 10 being at a short distance from the surface S of the material MS to be inspected in this case.

The material MS to be inspected can be any type of material, in particular coarse-grained materials, such as for example coarse-grained steels.

The multi-element probe 10 comprises M emitting ultrasonic transducers 14, these emitting ultrasonic transducers 14 respectively having an index i (which is a first natural integer) going from 1 to M, where M is a second prescribed natural integer greater than or equal to 2. In one embodiment, M is a second prescribed natural integer greater than or equal to 3. The multi-element probe 10 comprises M receiving ultrasonic transducers 15 having respectively an index j (which is a fifth natural integer) going from 1 to M.

During a second step E2, subsequent to the first step E1, the M emitting ultrasonic transducers 14 of index i of the multi-element probe 10 successively emit an ultrasonic signal S1 against the surface S of the material MS at successive respective emission instants $IE_i$. In response to each ultrasonic signal S1 emitted by each emitting ultrasonic transducer 14 of index i at the respective emission instant $IE_i$, (and before the respective emission instant $IE_{i+1}$ of the following emitting ultrasonic transducer 14 of index i+1), the M receiving ultrasonic transducers 15 of index j receive during the second step E2 the ultrasonic measurement signals x(n, i, j) which are representative of the amplitude of the ultrasounds S2 propagated in the material MS, for j going from 1 to M. Each receiving ultrasonic transducer of index j receives these ultrasonic measurement signals x(n, i, j) at sampling instants $n \cdot T_e$ (after the respective emission instant $IE_i$ of the emitting ultrasonic transducer 14 of index i and before the respective emission instant $IE_{i+1}$ of the following emitting ultrasonic transducer 14 of index i+1), where n is a third natural integer going from 1 to N, where N is a fourth prescribed natural integer greater than or equal to 2 and where $T_e$ is a prescribed sampling period (inverse of a prescribed sampling frequency). The M emitting ultrasonic transducers 14 of index i of the multi-element probe 10 and the M receiving ultrasonic transducers 15 of index j can have the first emission-reception configuration, which will be described below. The sampling instants $n \cdot T_e$ are defined to within a constant with respect to an initial instant.

According to one embodiment of the invention, each ultrasonic transducer 14, 15 can alternately play the role of emitter or receiver. Each ultrasonic transducer 14, 15 can be put in an ultrasound emitting mode or in an ultrasound receiving mode. In this case, the M emitting ultrasonic transducers 14 of index i of the multi-element probe 10 coincide with the M receiving ultrasonic transducers 15 of index j of the multi-element probe 10.

According to another embodiment of the invention, the M emitting ultrasonic transducers 14 of index i of the multi-element probe 10 are distinct from the M receiving ultrasonic transducers 15 of index j of the multi-element probe 10.

Figure 2:
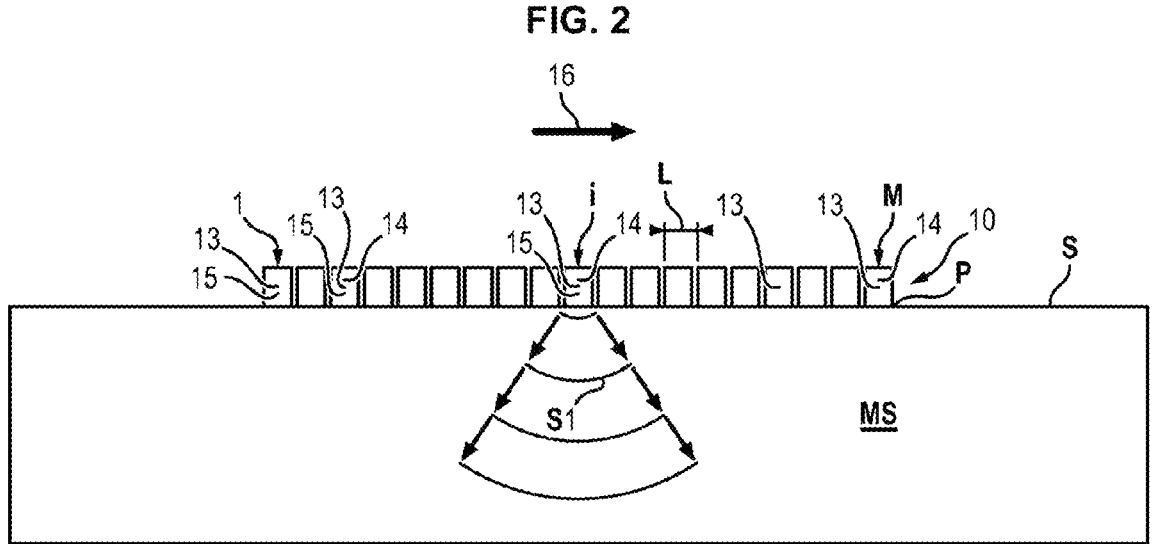
FIG. 2 represents a schematic cross-sectional view of a device for detecting defects by ultrasound according to one embodiment of the invention.
Figure 3:
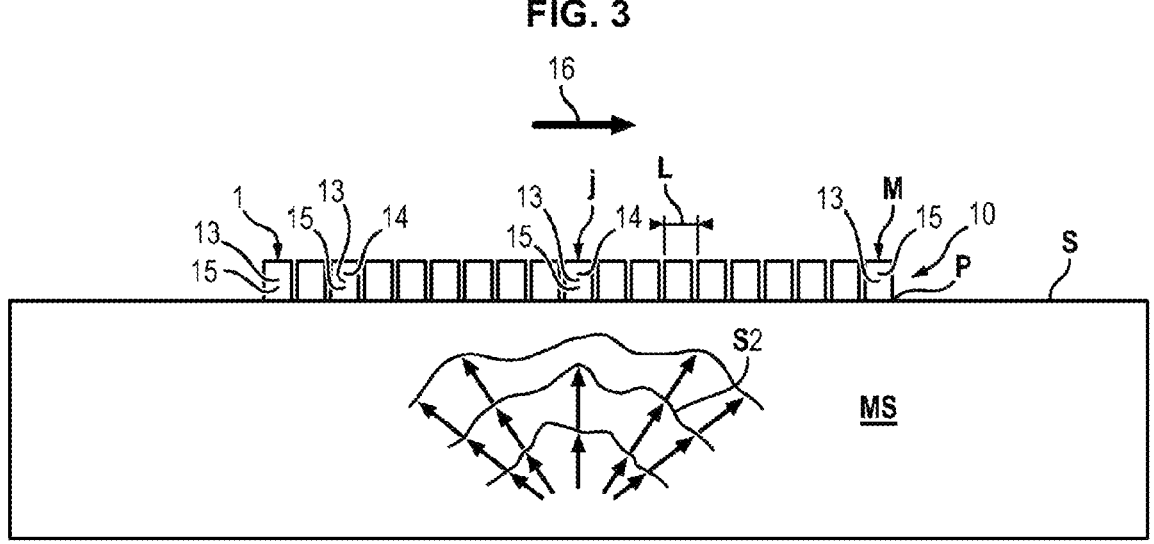
FIG. 3 represents a schematic cross-sectional view of a device for detecting defects by ultrasound according to one embodiment of the invention.

According to one embodiment of the invention, the M emitting ultrasonic transducers 14 of index i and the M receiving ultrasonic transducers 15 of index j are evenly distributed in the multi-element probe 10, as represented by way of non-limiting example in FIGS. 2 and 3. For example, the M emitting ultrasonic transducers 14 of index i respectively form part of M ultrasound emitting-receiving units 13 located at respectively M distinct prescribed positions in the multi-element probe 1, and the M receiving ultrasonic transducers 15 of index j respectively form part of these M ultrasound emitting-receiving units 13, as represented by way of non-limiting example in FIGS. 2 and 3. Of course, any other distribution of the ultrasonic transducers 14, 15 can be provided.

Figure 4:
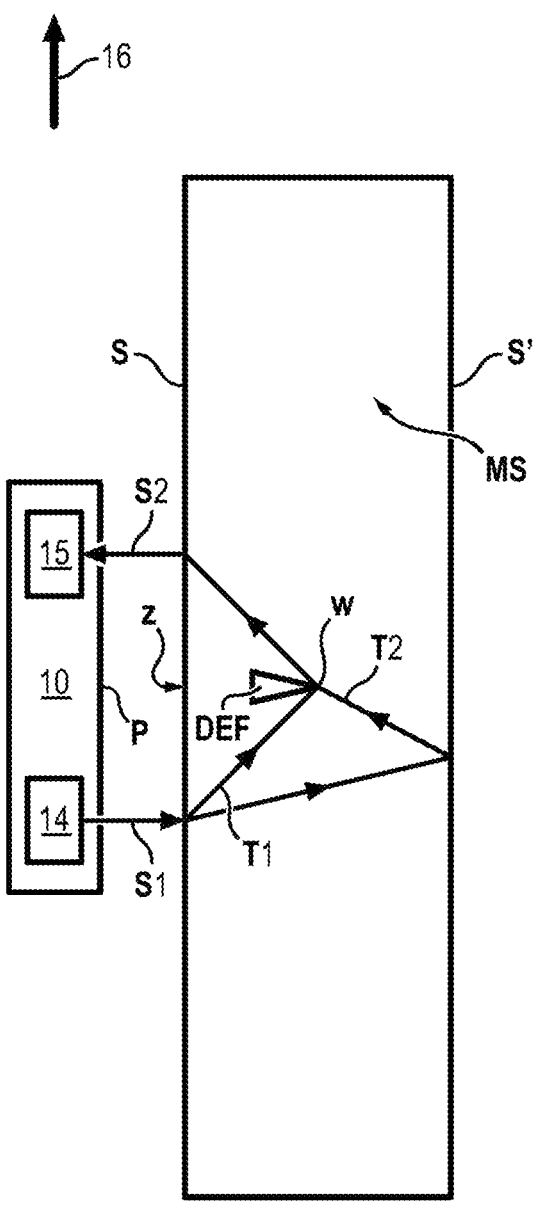
FIG. 4 represents a schematic cross-sectional view of a device for detecting defects by ultrasound according to one embodiment of the invention.
Figure 5:
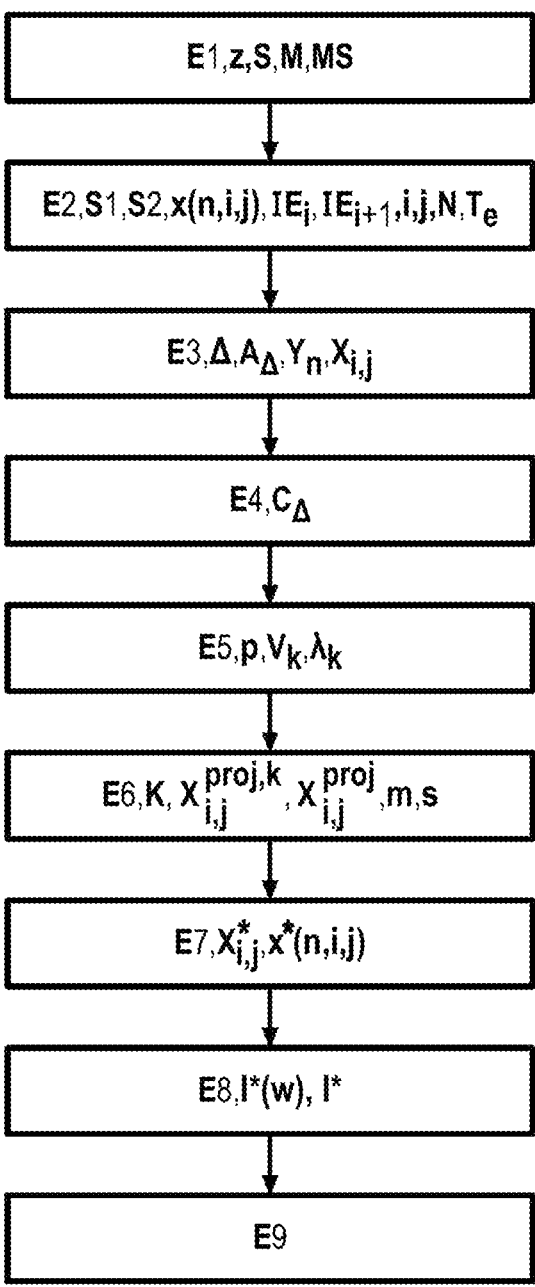
FIG. 5 represents a flowchart of a method for detecting defects by ultrasound according to one embodiment of the invention.

According to one embodiment of the invention, the M emitting ultrasonic transducers 14 of index i and the M receiving ultrasonic transducers 15 of index j are distributed in a plane P, for example parallel to the surface S of the material MS and can be on the surface S of the material MS or at a non-zero distance from the surface S of the material MS, as represented by way of non-limiting example in FIGS. 2 to 4.

According to one embodiment of the invention, the M emitting ultrasonic transducers 14 of index i and the M receiving ultrasonic transducers 15 of index j are distributed along one (or several) rectilinear axis 16, as represented for example in FIGS. 2 and 3. In this case, the probe 10 can be a multi-element strip where the M emitting ultrasonic transducers 14 of index i and the M receiving ultrasonic transducers 15 of index j are aligned along this rectilinear axis 16.

According to one embodiment of the invention, the plane P in which the M emitting ultrasonic transducers 14 of index i and the M receiving ultrasonic transducers 15 of index j are located is parallel to the plane of the surface S of the examined material MS.

According to one embodiment of the invention, one or several or all of the M emitting ultrasonic transducers 14 of index i and of the M receiving ultrasonic transducers 15 of index j can be at a distance from the surface S of the material MS.

According to another embodiment of the invention, the plane P in which the M emitting ultrasonic transducers 14 of index i and the M receiving ultrasonic transducers 15 of index j are located is inclined with respect to the surface S, and one or several or all of the M emitting ultrasonic transducers 14 of index i and of the M receiving ultrasonic transducers 15 of index j can be at a distance from the surface S of the material MS.

According to another embodiment of the invention, the plane P in which the M emitting ultrasonic transducers 14 of index i and the M receiving ultrasonic transducers 15 of index j are located is at a non-zero distance from the surface S, and can be parallel or inclined with respect to the surface S of the material MS.

According to one embodiment of the invention, the M emitting ultrasonic transducers 14 of index i are distributed according to M prescribed coordinates i·L separated from each other by the same non-zero prescribed pitch L with respect to each other (this coordinate can be an abscissa i·L along one (or several) rectilinear axis 16 with the rectilinear pitch L therebetween, or can be an angle i·L about another axis in the case of the M emitting ultrasonic transducers 14 of index i distributed about this other axis with the angular pitch L therebetween, or others), and/or the M receiving ultrasonic transducers 15 of index j are distributed according to M prescribed coordinates j·L separated from each other by a non-zero prescribed pitch L with respect to each other (this coordinate can be an abscissa j·L along one (or several) rectilinear axis 16 with the rectilinear pitch L therebetween or can be an angle i·L about another axis in the case of the M receiving ultrasonic transducers 15 of index j distributed about this other axis with the angular pitch L therebetween, or others), as represented by way of non-limiting example in FIGS. 2 and 3. Of course, the M emitting ultrasonic transducers 14 of index i may not be distributed according to the same non-zero prescribed pitch L with respect to each other and/or the M receiving ultrasonic transducers 15 of index j may not be distributed according to the same non-zero prescribed pitch L with respect to each other.

For a given position of the probe 10 with respect to the surface S of the material MS, a 3-dimensional matrix of measurement signals x(n, i, j) is available, where n corresponds to a number of discrete time steps, i is the index of the emitting ultrasonic transducer 14 and j is the index of the receiving ultrasonic transducer 15.

During a third step E3, subsequent to the second step E2, a calculator CAL forming part of the defect detection device 100 forms a sampling matrix $A_\Delta$, having N columns $Y_n$. The sampling matrix $A_\Delta$ groups together all of the measurement signals x(n, i, j) acquired for n going from 1 to N having the same distance gap $\Delta$ between the receiving ultrasonic transducers 15 of index j and the emitting ultrasonic transducers 14 of index i. The N columns $Y_n$ are formed by the measurement signals x(n, i, j) and correspond to the N sampling instants $n·T_e$ of the M receiving ultrasonic transducers 15. The calculator CAL can form part of the probe 10 or is linked or connected to the probe 10. It can be provided as calculator CAL for example one or several calculator(s) and/or one or several computer(s), and/or one or several processor(s) and/or one or several server(s) and/or one or several machine(s), which can be programmed in advance by a pre-recorded computer program for implementing the method and which can comprise one or several permanent memories, on which this program is pre-recorded. The calculator CAL automatically executes the steps of the defect detection method. Another calculator linked to the probe 10 or integrated into the probe 10 can record the acquisitions, that this other calculator or the calculator CAL can then process by the method according to the invention.

Each column $Y_n$ is formed of the measurement signals x(n, i, j) for which a distance d(i, j) between the receiving ultrasonic transducer 15 of index j and the emitting ultrasonic transducer 14 of index i is equal to a prescribed gap $\Delta$, which is identical for the N columns $Y_n$ (and therefore equal to the distance d(i', j') between the receiving ultrasonic transducer 15 of index j' and the emitting ultrasonic transducer 14 of index i' for the pair (i, j) different from the pair (i', j')). The gap $\Delta$ for each matrix $A_\Delta$ is prescribed to the calculator CAL. This gap $\Delta$ can be positive or zero. So we have:

d(i, j)=d(i', j')=$\Delta$ for the pair (i, j) different from the pair (i',j') in the matrix $A_\Delta$.

The rows $X_{i,j}$ of the matrix $A_\Delta$ are formed of the measurement signals x(n, i, j) for n going from 1 to N, for which the index i is identical in each row $X_{i,j}$ and the index j is identical in each row $X_{i,j}$, the pair i, j being different from one row $X_{i,j}$ to another.

The calculator CAL therefore forms the sampling matrix $A_\Delta$, which is defined by the following equations:

$$A_\Delta = (Y_1 \ \dots \ Y_n \ \dots \ Y_N)$$

$$Y_1 = \begin{pmatrix} x(1, i, j) \\ \vdots \\ x(1, i', j') \end{pmatrix}$$

$$Y_n = \begin{pmatrix} x(n, i, j) \\ \vdots \\ x(n, i', j') \end{pmatrix}$$

$$Y_N = \begin{pmatrix} x(N, i, j) \\ \vdots \\ x(N, i', j') \end{pmatrix}$$

$$A_\Delta = \begin{pmatrix} x(1, i, j) & \cdots & x(n, i, j) & \cdots & x(N, i, j) \\ \vdots & & \vdots & & \vdots \\ x(1, i', j') & \cdots & x(n, i', j') & \cdots & x(N, i', j') \end{pmatrix}$$

-continued $$A_\Delta = \begin{pmatrix} X_{i,j} \\ \vdots \\ X_{i',j'} \end{pmatrix}$$

$$X_{i,j} = (x(1, i, j) \ \cdots \ x(n, i, j) \ \cdots \ x(N, i, j))$$

$$X_{i',j'} = (x(1, i', j') \ \ldots \ x(n, i', j') \ \ldots \ x(N, i', j'))$$

Figure 6:
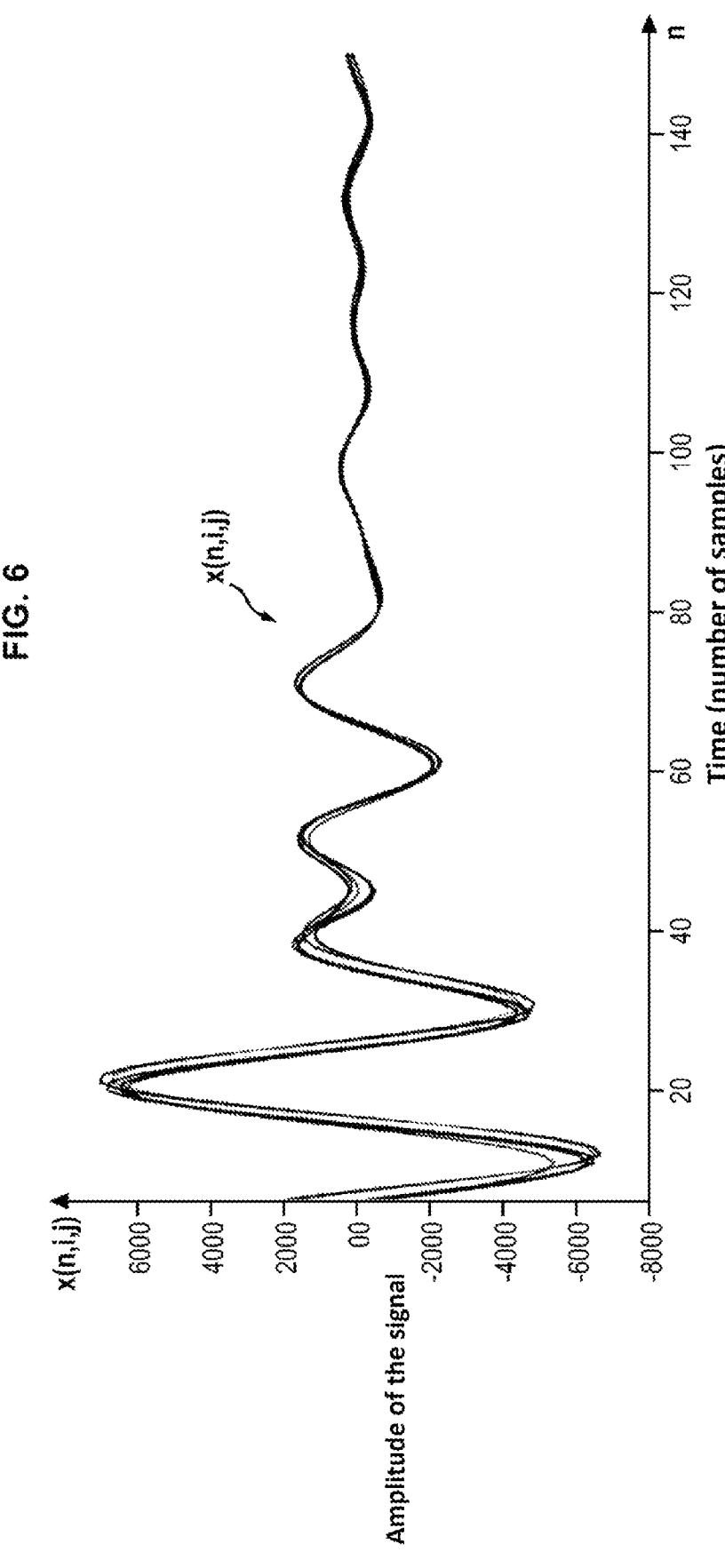
FIG. 6 represents measurement signals acquired during the method for detecting defects by ultrasound according to one embodiment of the invention.

The gap $\Delta$ is constant in each sampling matrix $A_\Delta$. In the absence of defects in the material MS, the signals x(n, i, j) with the same gap $\Delta$ have the same spatial and temporal characteristics. This is illustrated in FIG. 6, where several measurement signals x(n, i, j) for n belonging to an interval comprised in [1, . . . , N] with different pairs i, j between the receiving ultrasonic transducer 15 of index j and the emitting ultrasonic transducer 14 of index i but with the same distance gap $\Delta$=10 between these receiving ultrasonic transducers 15 of index j and these emitting ultrasonic transducers 14 of index i have been represented as non-limiting example and where these measurement signals x(n, i, j) are substantially identical for different positions of these receiving ultrasonic transducers 15 of index j and of these emitting ultrasonic transducers 14 of index i. The abscissa axis corresponds to the time n in number of samples, and the ordinate axis corresponds to the amplitude x(n, i, j) of the received signal. The frequency of the ultrasonic waves S1 emitted by the emitting transducers 14 of index i is, by way of non-limiting example, of 5 MHz in FIG. 6.

For example, in each column $Y_n$ of the sampling matrix $A_\Delta$ associated with $\Delta$=5 L, we will find, for n going from 1 to N:

the signal x(n, 1, 6) emitted by the emitting ultrasonic transducer 14 of index i=1 and received by the receiving ultrasonic transducer 15 of index j=6, the signal x(n, 2, 7) emitted by the emitting ultrasonic transducer 14 of index i=2 and received by the receiving ultrasonic transducer 15 of index j=7, the signal x(n, 3, 8) emitted by the emitting ultrasonic transducer 14 of index i=3 and received by the receiving ultrasonic transducer 15 of index j=8, etc. . . . .

During the steps E4 to E6 described below and subsequent to the third step E3, the calculator CAL implements a principal component analysis (PCA) algorithm on the sampling matrix $A_\Delta$.

During the fourth step E4 subsequent to the third step E3, the calculator CAL calculates the covariance matrix $C_\Delta$ corresponding to the sampling matrix $A_\Delta$ described above. The coefficient $c_{r,q}$, of the $r^{th}$ row and the $q^{th}$ column of the covariance matrix $C_\Delta$ is equal to: $c_{r,q}$=cov($Y_r$, $Y_q$) for r being a natural integer going from 1 to N and q being a natural integer going from 1 to N, where $Y_r$, $Y_q$ denote the columns of the sampling matrix $A_\Delta$. The covariance matrix $C_\Delta$ is calculated as a function of the sampling matrix $A_\Delta$ according to the following equation, for n going from 1 to N $$A_\Delta = (Y_1 \ \ldots \ Y_n \ \ldots \ Y_N)$$

$$C_\Delta = \begin{pmatrix} cov(Y_1, Y_1) = var(Y_1) & \cdots & cov(Y_1, Y_n) & \cdots & cov(Y_1, Y_N) \\ \vdots & & \vdots & & \vdots \\ cov(Y_N, Y_1) & & \cdots \ cov(Y_N, Y_n) \ \cdots & cov(Y_N, Y_N) = var(Y_N) \end{pmatrix}$$

where var denotes the variance of a column and cov denotes the covariance between two columns. The covariance matrix $C_\Delta$ is square, of dimension N×N and symmetrical.

During the fifth step E5 subsequent to the fourth step E4, the calculator CAL calculates p eigenvectors $V_k$ and p eigenvalues $\lambda_k$ associated with the eigenvectors $V_k$ for the covariance matrix $C_\Delta$ corresponding to the sampling matrix $A_\Delta$, for k going from 1 to p. The number p is a sixth prescribed natural integer, greater than or equal to 2 and is a prescribed maximum number of calculated eigenvectors $V_k$ (and is a prescribed maximum number of calculated eigenvalues $\lambda_k$). For example, p=N. In another example, we could have p≤N. In another example, we could have p<N (fewer eigenvectors than number N of columns of the covariance matrix $C_\Delta$ can be calculated). For p=N, the eigenvectors $V_k$ form a basis: any row of the matrix $A_\Delta$ can be decomposed as a linear combination of the N eigenvectors $V_k$ for k going from 1 to N.

During the sixth step E6 subsequent to the fifth step E5, the calculator CAL calculates projections $X_{i,j}^{proj,k}$ for k going from 1 to K of the rows $X_{i,j}$ of the sampling matrix $A_\Delta$ on the K eigenvectors $V_k$ corresponding to the K largest eigenvalues $\lambda_k$ of the covariance matrix $C_\Delta$ corresponding to the sampling matrix $A_\Delta$, with K<p. The eigenvalues of the decomposition into eigenvectors of a covariance matrix are positive real values, because this covariance matrix is square and symmetrical. The number K is prescribed to the calculator CAL or determined by the calculator CAL, which number is smaller than the maximum number p of eigenvectors $V_k$ and of eigenvalues $\lambda_k$. To do so, the calculator can order the eigenvalues $\lambda_k$ of the covariance matrix $C_\Delta$ corresponding to the sampling matrix $A_\Delta$ and select the K largest eigenvalues $\lambda_k$.

The measurement signals x(n, i, j) can contain several pieces of information: the information associated with the surface waves, with the structural noise, but also possibly pieces of information associated with a defect in the material MS, a defect that is desired to be detected. The complex materials MS generate noise due to the different phenomena of wave scattering. Moreover, the noise is omnipresent in the measurement signals x(n, i, j), and on the contrary, a defect is not always present. Even if there is a defect, then it does not represent a large amount of information on all the signals targeted. Thus, the information contained in the K eigenvectors with large eigenvalues $\lambda_k$ is that of the predominant spurious noise (typically the surface wave), while the information contained in the other eigenvectors with small eigenvalues corresponds to any defects/artifacts present in the signals. A property of the decomposition into eigenvectors $V_k$ and into eigenvalues $\lambda_k$ is that the K eigenvectors $V_k$ corresponding to the K largest eigenvalues $\lambda_k$ will correspond to the predominant information, while the eigenvectors $V_k$ associated with the small eigenvalues $\lambda_k$ will correspond to information more embedded in this predominant information. The number K is therefore the number of components to retain from the decomposition into eigenvectors of the covariance matrix $C_\Delta$ corresponding to the sampling matrix $A_\Delta$.

During the seventh step E7 subsequent to the sixth step E6, the calculator CAL subtracts from each of the rows $X_{i,j}$ of the sampling matrix $A_\Delta$ the projections $X_{i,j}^{proj,k}$ for k going from 1 to K of this row $X_{i,j}$ on the K eigenvectors $V_k$ corresponding to the K largest eigenvalues $\lambda_k$ of the covariance matrix $C_\Delta$ corresponding to this sampling matrix $A_\Delta$. The result of this operation is, according to the same formalism as the sampling matrix $A_\Delta$, residual defect detection rows $X^*_{i,j}$ formed by the residual defect detection measurement signals x*(n, i, j) (called signals x* below) for n going from 1 to N, for which the index i is identical in each residual defect detection row $X^*_{i,j}$ and the index j is identical in each residual defect detection row $X^*_{i,j}$, the pair i,j being different from one residual defect detection row $X^*_{i,j}$ to another. This removes a certain amount of noise from the signals, so that the defect information of the material MS takes over. Thus, from each row vector $X_{i,j}$ is subtracted the projection $X_{i,j}^{proj,k}$ of itself onto the K eigenvectors $V_k$ corresponding to the K largest eigenvalues $\lambda_k$. The number K is therefore the number of removed components. The calculator CAL therefore calculates the residual defect detection rows $X^*_{i,j}$ corresponding to the residual defect detection measurement signals x*(n, i, j), for n going from 1 to N, which are defined by the following equations:

$$X_{i,j}=(x(1,i,j) \ldots x(n,i,j) \ldots x(N,i,j))$$

$$X_{i,j}^*=(x^*(1,i,j) \ldots x^*(n,i,j) \ldots x^*(N,i,j))$$

$X_{i,j}^{proj,k}$ is the projected vector of $X_{i,j}$ onto the $k^{th}$ eigenvector $V_k$:

$$X_{i,j}^{proj,k}=(X_{i,k}V_k^T)V_k$$

where the operator $( )^T$ designates the transposition, $X_{i,j}^{proj,k}$ is the sum of the projected vectors of the $X_{i,j}$ on the K eigenvectors $V_1, \ldots, V_k, \ldots, V_K$ for k going from 1 to K:

$$X_{i,j}^{proj} = \sum_{k=1}^{K} X_{i,j}^{proj,k}$$

where $V_k$ is a row vector. Consequently, during the seventh step E7, the calculator CAL subtracts from each of the rows $X_{i,j}$ of the sampling matrix $A_\Delta$ the sum $X_{i,j}^{proj,k}$ of the projections $X_{i,j}^{proj,k}$ for k going from 1 to K of this row $X_{i,j}$ on the K eigenvectors $V_k$ corresponding to the K largest eigenvalues $\lambda_k$ of the covariance matrix $C_\Delta$ corresponding to this sampling matrix $A_\Delta$, to obtain the residual defect detection row $X^*_{i,j}$.

So we have: $X^*_{i,j}=X_{i,j}-X_{i,j}^{proj,k}$

By convention, the vectors are represented with a capital letter.

The residual defect detection measurement signals x*(n, i, j) are therefore relieved of a certain amount of noise to reveal the small variations representing the defects of the material MS.

According to one embodiment of the invention, the calculator CAL calculates the residual defect detection measurement signals x*(n, i, j) for several prescribed gaps Δ, which are different from each other.

According to one embodiment of the invention, the calculator CAL calculates the residual defect detection measurement signals x*(n, i, j) for all of the prescribed gaps Δ corresponding to all of the combinations of the M emitting ultrasonic transducers 14 of indexes i with the M receiving ultrasonic transducers 15 of indexes j.

According to one embodiment of the invention, K can be equal from one prescribed gap Δ to another and therefore from one sampling matrix $A_\Delta$ to another.

According to another embodiment of the invention, K can be different from one prescribed gap Δ to another and therefore from one sampling matrix $A_\Delta$ to another.

According to one embodiment of the invention, the calculator CAL performs, during an eighth step E8 subsequent to the seventh step E7, a post-processing for detecting defects in the material MS from the residual defect detection measurement signals x*(n, i, j).

According to one embodiment of the invention, the calculator CAL performs, during the eighth step E8, as defect detection post-processing, an algorithm of focusing on the residual defect detection measurement signals x*(n, i, j). Of course, the defect detection post-processing of the material MS may be other than the focusing algorithm, or may even be absent, the eighth step E8 being optional.

Embodiments of the invention of this focusing algorithm, of the type of focusing on every point (TFM), during step E8, are described below.

According to one embodiment of the invention, the focusing algorithm is performed during step E8 by the calculator CAL on the residual defect detection measurement signals x*(n, i, j). The calculator CAL calculates an image in which each pixel of the image represents a probed point w of the material MS with which a focused amplitude for said probed point w is associated.

By way of non-limiting example, during an ultrasonic shot at a position z of the multi-element probe 10, one (or several) emitting transducer(s) 14 emit ultrasonic waves S1 which enter the material MS at the level of its surface S, then propagate in the material MS, before being received by a receiving transducer 15. In order to illustrate the propagation of the ultrasonic waves S1 and S2 in the material, FIG. 4 represented a first travel T1 constituting a short path for the ultrasonic waves S1 and S2, which are diffracted by the defect DEF in the direction of the receiving transducer 15, and a second travel T2 constituting a long path for the ultrasonic waves S1 and S2, which are reflected by another surface S' of the material M, away from its surface S, in the direction of the defect DEF then join the receiving transducer 15.

In one approach, the different configurations are distinguished from each other by emitter or receiver functions fulfilled by different transducers 14, 15.

For example, in a first emission-reception configuration, a first transducer 14 (or a first set of transducers 14) is individually excited with a pulsed electrical signal in order to emit ultrasounds S1. These ultrasounds propagate in the material, and are then received by all the transducers 14, 15 (or by a second set of transducers 15). Then, at the same probe position z, another transducer 14 (or another first set of transducers 14) is individually excited with a pulse electrical signal in order to emit ultrasounds S1. These ultrasounds S1 propagate in the material, and are then received by all the transducers 14, 15 (or by another second set of transducers 15). Preferably, each of the transducers 14, 15 emits ultrasounds in at least one probe configuration at a position z. Typically, each of the transducers 14, 15 is alternately the only emitting transducer, while all the transducers 14, 15 receive the ultrasounds. There are then as many ultrasonic shots as there are transducers 14, 15 in the first emission-reception configuration. Of course, this first emission-reception configuration is not limiting and other emission-reception configurations of the transducers 14 and 15 can be provided.

According to one embodiment of the invention, the focusing algorithm on every point comprises during step E8 a step of calculating by the calculator CAL an indicator $I^*(w)$ for each probed position w as follows:

$$I^*(w) = \sum_{i=1}^{M} \sum_{j=1}^{M} x^*(t(w, i, j), i, j)$$

where t(w, i, j) corresponds to the travel time (expressed in number of samples) for a signal emitted by the emitting ultrasonic transducer of index i, reflected at the probed position w and received by the receiving ultrasonic transducer of index j, t(w, i, j) corresponds to one of the sampling instants $n \cdot T_e$ and where n is calculated between 1 and N, and a step of forming, by the calculator CAL, an image $I^*$, for which w represents the probed positions in a cross-section of the material MS and corresponds to positions of pixels of the image $I^*$, the value of the pixels of the image $I^*$ at the positions w being equal to the indicator $I^*(w)$. Thus, w represents a probed position in a cross-section of the material and corresponds to a position of a pixel of the image $I^*$, the value of a pixel of the image $I^*$ at the position w being equal to the indicator $I^*(w)$. The final image $I^*$ is produced when the indicators $I^*$ have been calculated for the positions w of all the pixels of the image $I^*$.

Thus, t(w, i, j) can be the travel time for an ultrasonic signal:
    emitted by the transducer i,
    reflected by a point of the supposed defect DEF located at the position w,
    and captured by the transducer j.
but t(w, i, j) can also be the travel time for a signal:
    emitted by the transducer i,
    reflected by the background S' of the material MS,
    reflected by a point of the supposed defect DEF located at position w,
    and captured by the transducer j.

These travel times t(w, i, j) are calculated by the calculator CAL from the waves velocities which depend on the type of propagation (transverse waves, longitudinal waves). Mode conversions can also be envisaged during the different reflections.

The indicator $I^*(w)$ being calculated for a cross-section of the material MS as a function of the position z of the probe 10, the calculator CAL will finally obtain an image $I^*$ which will be called hereinafter TFM imaging or image.

The formula of the TFM can be generalized during step E8 in the form:

$$I^*(w) = \sum_{i=1}^{M} \sum_{j=1}^{M} g(x^*(t(w, i, j), i, j))$$

where t(w, i, j) corresponds to the travel time (expressed in number of samples) for a signal emitted by the emitting ultrasonic transducer of index i, reflected at the probed position w and received by the receiving ultrasonic transducer of index j, where t(w, i, j) corresponds to one of the sampling instants $n \cdot T_e$ and where n is calculated between 1 and N, and a step of forming, by the calculator CAL, an image $I^*$, for which w represents the probed positions in a cross-section of the material MS and corresponds to positions of pixels of the image $I^*$, the value of the pixels of the image $I^*$ at the positions w being equal to the indicator $I^*(w)$, where g is a prescribed function. Thus, w represents a probed position in a cross-section of the material and corresponds to a position of a pixel of the image $I^*$, the value of a pixel of the image $I^*$ at the position w being equal to the indicator $I^*(w)$. The final image $I^*$ is produced when the indicators $I^*$ have been calculated for the positions w of all the pixels of the image $I^*$.

Several variants of the TFM during step E8 are possible depending on the choice of g. The most common choices of g are the following:

$$g(x) = x,$$

g(x) is different from x,
    g depends on the probed position w and/or on the wave propagation velocity,
    g can also be the absolute value of the signal or the modulus of the analytical signal.

The method and device 100 for detecting defects according to the invention allow a gain in decibels, which facilitates the detection of defects, in particular in the vicinity of the surface S of the material MS.

Figure 7:
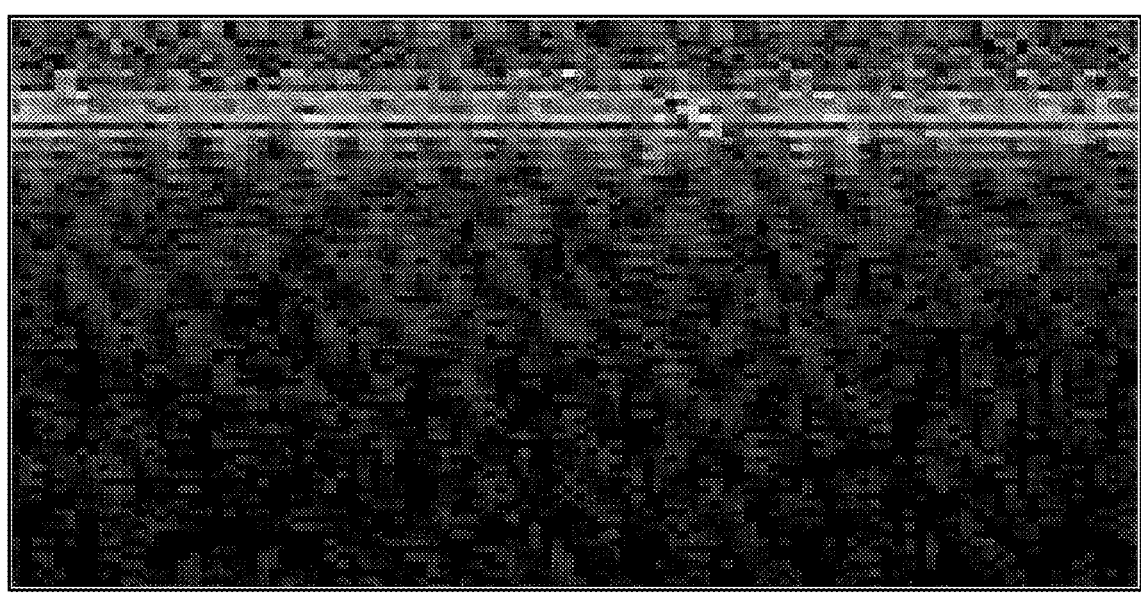
FIG. 7 represents an image obtained without implementing the method and device for detecting defects according to one embodiment of the invention.

Indeed, FIG. 7 represents a TFM image obtained solely from the signals x(n, i, j) without implementing the method and the device 100 for detecting defects according to the invention. This TFM image in FIG. 7 contains a defect close to the surface S, which is however difficult to identify because of the phenomena explained above.

Figure 8:
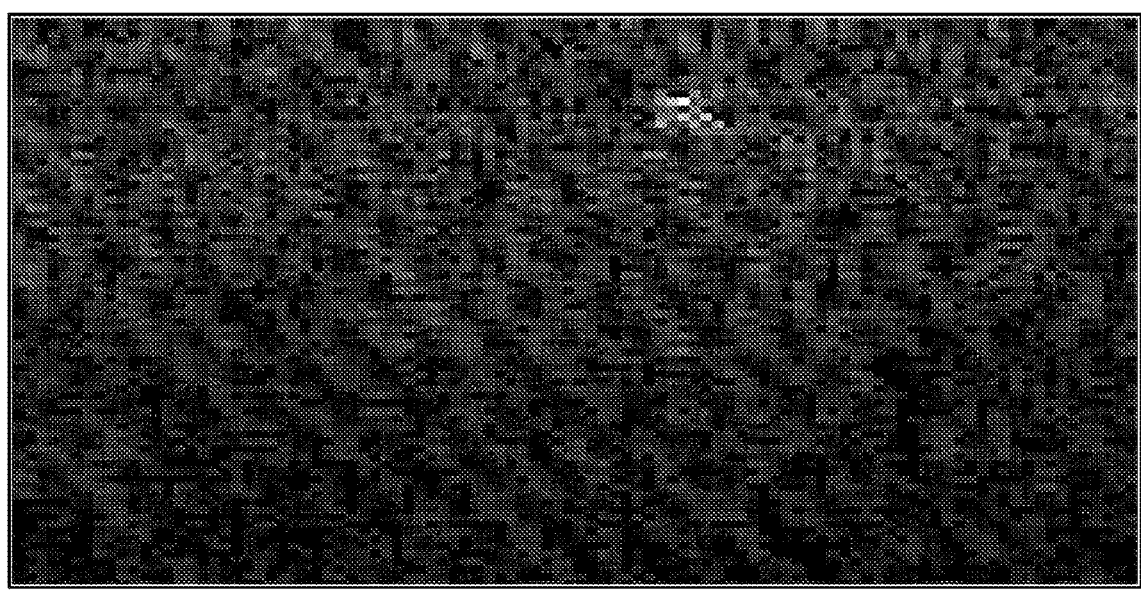
FIG. 8 represents an image obtained by implementing the method and device for detecting defects according to one embodiment of the invention from the measurement signals in FIG. 7.

By applying the method and device 100 for detecting defects according to the invention, the TFM image in FIG. 8, with initially the parameter K set to 4, is obtained from the signals x*(n, i, j) described above.

A defect at about 2.5 mm depth is highlighted in FIG. 8, which was embedded in the very present noise close to the surface S in FIG. 7.

Figure 9:
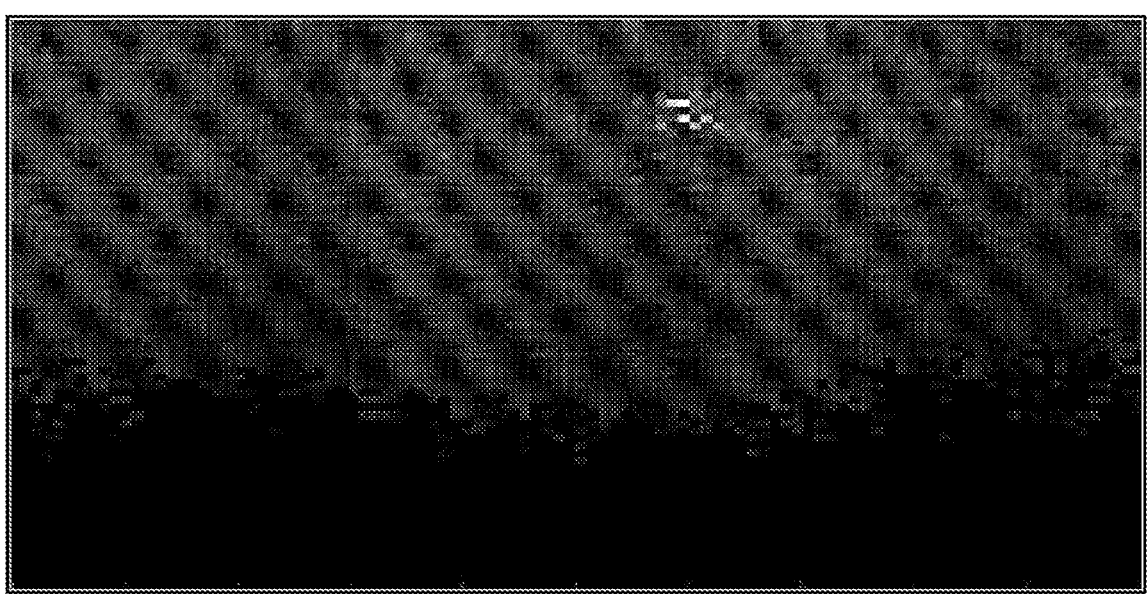
FIG. 9 represents an image obtained by implementing the method and device for detecting defects according to one embodiment of the invention which further comprises the application of a bilateral filtering.

In one embodiment of the invention, an additional step E9 of post-processing the TFM image can be applied by the calculator CAL after the eighth step E8. This additional step E9 of post-processing the TFM image can comprise a bilateral filtering applied to the image. FIG. 9 shows the image obtained by applying a bilateral filtering to the image in FIG. 8. This filtering improves the visual quality of the image as well as its SNR (Signal to Noise Ratio). The SNR is a quantitative indicator of the quality of such an image. The SNR is expressed in decibels (dB) and is calculated for example as follows:

$$SNR = 20 * \log\left(\frac{I_{defect}^{max}}{I_{noise}^{max}}\right)$$

where $I_{noise}^{max}$ corresponds to the maximum intensity of the pixels of the defect area,
$I_{noise}^{max}$ corresponds to the maximum intensity of the pixels of the noise area, that is to say the whole area except the defect area. A negative SNR indicates that the noise is higher in intensity than the defect, while a positive SNR indicates that the noise is lower in intensity than the defect. This filter is effective only because the quality of the image in FIG. 8 is sufficient (that is to say there is a good distinction between the defect area and the rest).

The example illustrated in FIGS. 7 and 8 allowed to obtain a SNR gain of 18.1 dB (by changing the SNR from 4.7 in FIG. 7 to 22.8 in FIG. 8). The image in FIG. 9 has an SNR of 33.2.

A summary of performances on different configurations of transducers and for different defect depths is given below.

TABLE 1

| | Configuration 1 (depth of the defect = 5 mm) | Configuration 2 (depth of the defect = 5 mm) | Configuration 3 (depth of the defect = 10 mm) | Configuration 4 (depth of the defect = 10 mm) | Configuration 5 (depth of the defect = 15 mm) |
|---|---|---|---|---|---|
| SNR from the signals x (without x*) | −1.2 | −25.7 | 4.3 | −37.2 | −4.4 |
| SNR from the signals x* and K = 4 | 23.3 | 41.6 | 24.0 | 34.1 | 28.1 |
| SNR from the signals x* and K = 4 and with bilateral filtering | 29.1 | 56.7 | 35.3 | 50.3 | 42.5 |

Figure 10:
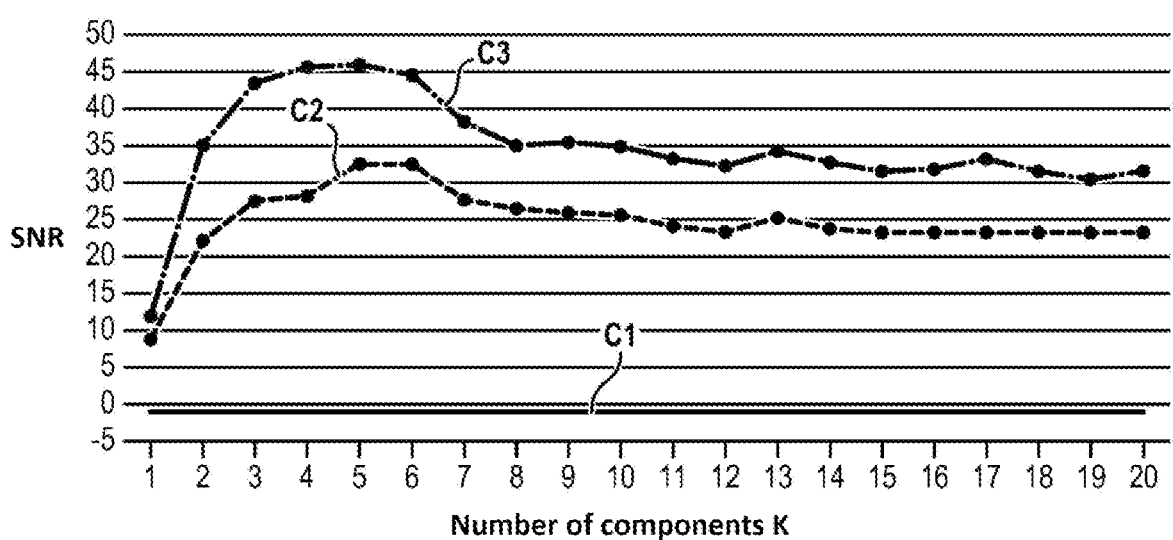
FIG. 10 is a graph representing the signal-to-noise ratio as a function of a chosen parameter of number of components of the method and device for detecting defects according to one embodiment of the invention.

The graph in FIG. 10 shows the SNR as a function of K for the same configuration. The curve C1 shows the SNR obtained from the signals x (without x*). The curve C2 shows the SNR obtained from the signals x*, without application of a bilateral filtering of the final image. The curve C3 shows the SNR obtained from the signals x*, with application of a bilateral filtering of the final image. The SNR of the raw signal, represented by the curve C1 formed by a horizontal straight line, is −1.0. This means that initially, the maximum intensity of the noise is greater than the maximum intensity of the defect. By applying the method and device 100 for detecting defects according to the invention, with more or fewer removed components (according to K), the SNR is clearly improved. The SNR gain can be increased with the addition of the bilateral filtering in additional post-processing E9 of the TFM image.

In other embodiments of the invention, the additional step E9 of post-processing the TFM image is not present.

The larger K is, the more components are removed, and removing more information will end up in removing the one associated with the possible defects DEF. It is for this reason that the curves C2 and C3 are increasing up to a certain threshold, then decreasing.

The optimal value of K is not the same for all the configurations, because it depends on the nature of the material MS and therefore on the acquisitions.

According to one embodiment of the invention, the number K is prescribed to the calculator CAL.

According to one embodiment of the invention, K can be determined by the calculator CAL by using one of the methods for automatically selecting the number of components known from the literature from the results obtained during steps E3 to E5. Thus, it is guaranteed that the choice of K is related and dependent on the particular case studied. In other words, the nature of the material MS to be inspected influences the choice of K.

According to one embodiment of the invention, the calculator CAL could implement a method for calculating K from the eigenvalues $(\lambda_k)$, and/or from the eigenvectors $(V_k)$, and/or from the covariance matrix $C_A$, and/or from the matrix $A_A$, and/or from the acquisitions x(n, i, j).

According to one embodiment of the invention, the calculator CAL retains from among all of N eigenvalues $(\lambda_k)_{1 \leq k \leq N}$ resulting from the decomposition into eigenvectors of the covariance matrix $C_A$, only those which are greater than m+2s, with m the average of the N eigenvalues, and s the standard deviation of the N eigenvalues. Consequently, the eigenvalues $(\lambda_k)_{1 \leq k \leq N}$ being arranged in decreasing order: $\lambda_1 \geq \lambda_2 \geq \ldots \geq \lambda_N$, the integer K to be retained by the calculator CAL is that for which $\lambda_K > m+2s$ and $\lambda_{K+1} \leq m+2s$.

According to one embodiment of the invention, in the case where p=N, the average m and the standard deviation s are calculated by the calculator CAL as follows, since all the eigenvalues can be accessed:

$$m = \frac{1}{N}\sum_{k=1}^{N}\lambda_k$$

$$s = \sqrt{\frac{1}{N-1}\sum_{k=1}^{N}(\lambda_k - m)^2} = \sqrt{\frac{1}{N-1}\left(\left(\sum_{k=1}^{N}\lambda_k^2\right) - Nm^2\right)}$$

These calculations assume that the number p of calculated eigenvalues is equal to the maximum number N of eigenvalues.

According to another embodiment of the invention, the calculator CAL calculates the average m and the standard deviation s of all the eigenvalues directly from the covariance matrix $C_A$. A property linking the eigenvalues $(\lambda_k)_{1 \leq k \leq N}$ and the covariance matrix $C_A$ is first recalled:

$$\mathrm{trace}\left(C_A^l\right) = \sum_{k=1}^{N}\lambda_k^l$$

where:
trace corresponds to the operator, for a square matrix, denoting the sum of the diagonal terms of the matrix,
l is an integer greater than or equal to 1 corresponding to the power to which the covariance matrix $C_A$ is raised in the left member, and to the power to which the eigenvalues (scalars) $\lambda_k$ are raised in the right member.
By using this property with l=1, we obtain for the average m the following result:

$$m = \frac{1}{N}\sum_{k=1}^{N}\lambda_k = \frac{\mathrm{trace}(C_A)}{N}$$

By using this property with l=2, we obtain for the standard deviation s the following result:

$$s = \sqrt{\frac{1}{N-1}\sum_{k=1}^{N}(\lambda_k - m)^2} =$$

$$\sqrt{\frac{1}{N-1}\left(\left(\sum_{k=1}^{N}\lambda_k^2\right) - Nm^2\right)} = \sqrt{\frac{1}{N-1}\left(\mathrm{trace}(C_\Delta^2) - Nm^2\right)}$$

The calculator CAL can therefore calculate the average m and the standard deviation s directly from the covariance matrix $C_\Delta$, before having calculated the eigenvalues and the eigenvectors of the covariance matrix $C_\Delta$. The calculator CAL can then calculate only the p=K eigenvalues and eigenvectors.

Figure 11:
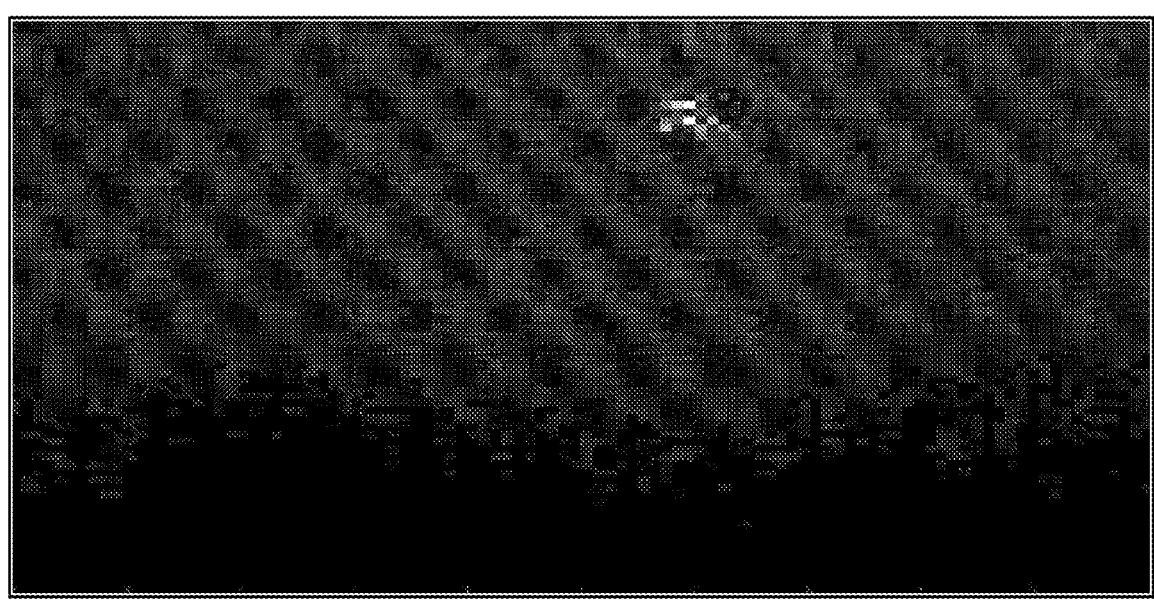
FIG. 11 represents an image obtained from the same configuration as in FIG. 7 by the method and device for detecting defects according one an embodiment of the invention with use of the criterion of selection of the number of components and addition of a bilateral filtering.

FIG. 11 presents the image of the same configuration as in FIG. 7 with use of the selection criterion of the number K of components and addition of a bilateral filtering. The SNR is 35.7.

Figure 12:
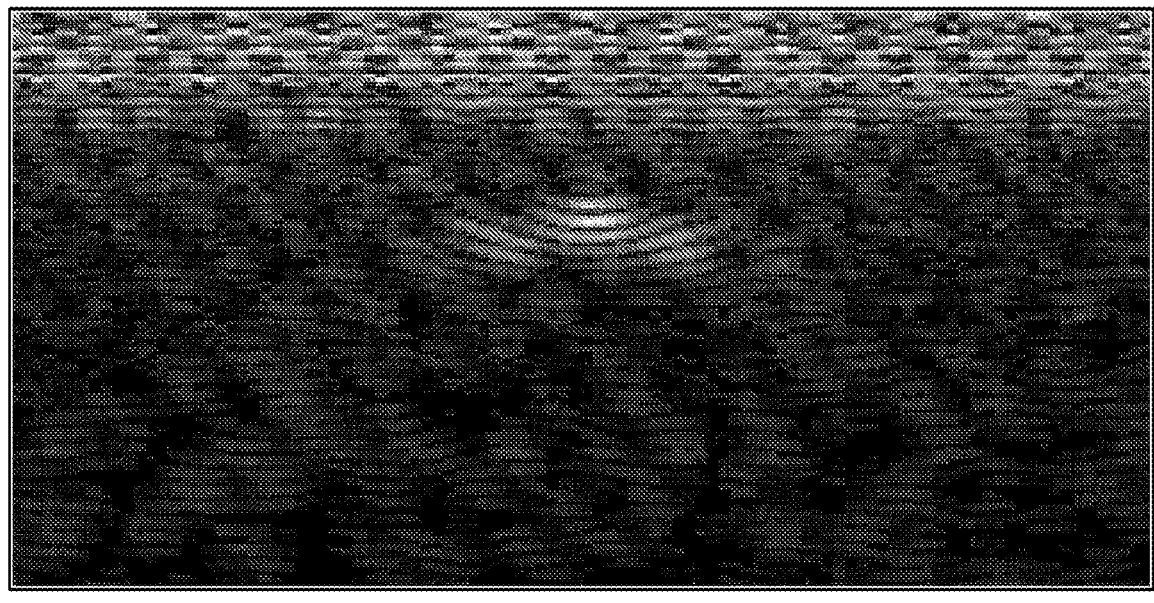
FIG. 12 represents an image obtained from the configuration used for the graph in FIG. 10 without having implemented the method and device for detecting defects according to one embodiment of the invention.

FIG. 12 shows the TFM image of the configuration used for the graph in FIG. 10 obtained only from the signals x(n, i, j) without implementing the method and device 100 for detecting defects according to the invention (SNR=−1.0).

Figure 13:
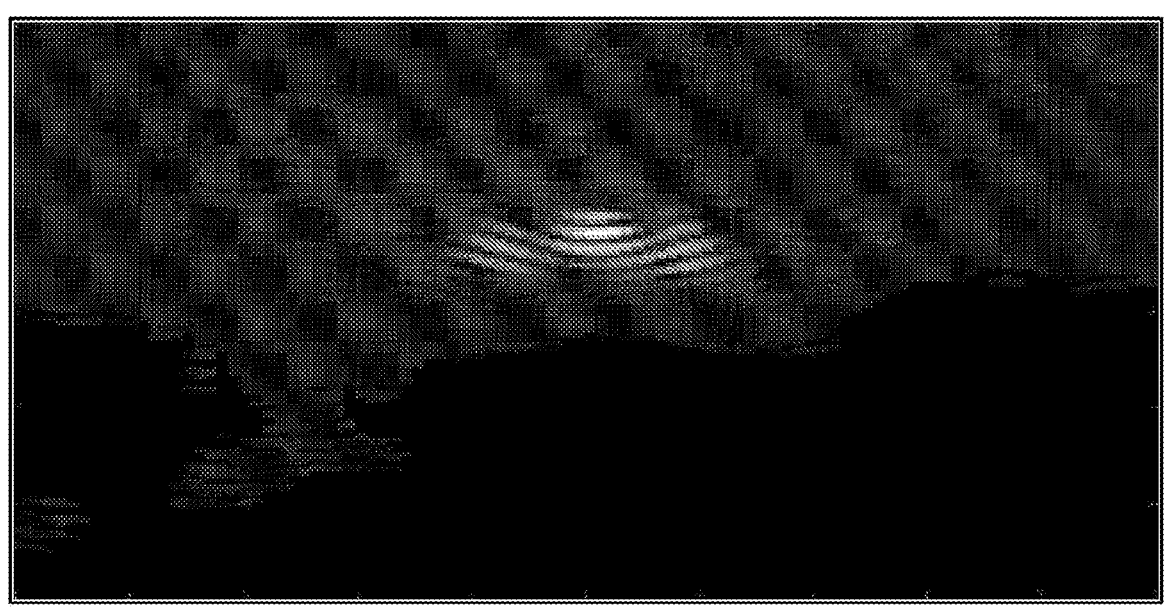
FIG. 13 represents an image obtained from the configuration used for the graph in FIG. 10 by the method and device for detecting defects according to one embodiment of the invention with use of the criterion of selection of the number of components and addition of a bilateral filtering.

FIG. 13 shows the TFM image obtained for the same example as before by using the transformed acquisitions x*(n, i, j), with selection of the number K of components for each A and addition of bilateral filtering. The method used for the choice of K in this example is the one with m+2s described above. The SNR is 46.6, which is slightly larger than the best case of the graph presented in FIG. 10. This improvement comes from the fact that for the graph in FIG. 10, the K is the same for all the A.

According to one embodiment of the invention, the calculator CAL recalculates the eigenvectors and the number K of components to be removed for each new checking of a material MS.

According to another embodiment of the invention, the calculator CAL records the eigenvectors and the number K of components to be removed from a given material MS, in order to be able to reuse them the next times on this given material MS. The calculation time will be automatically greatly reduced the next times.

According to another embodiment of the invention, it may be interesting not to consider all the acquired samples x(n, i, j) for n going from 1 to N, but to be restricted to a given time area, for example:

$$x([n_0, n_0+1, \ldots, n_1], i, j)$$

with $n_0$ (respectively $n_1$) the first (respectively the last) sample considered for each signal x(n, i, j). This makes it possible to focus on a time area of interest, corresponding to the depth of the defect sought, and to reduce the calculation time.

According to one embodiment of the invention, the defect detection method is executed for several positions z (different from each other) of the multi-element probe 10 at the surface S of the material MS to be inspected.

Of course, the embodiments, characteristics, possibilities, variants and examples described above can be combined with each other or selected independently of each other.

The invention claimed is:

1. A method for detecting, by ultrasound, defects in a material, characterized in that the method comprises the following steps:

a) successively emitting ultrasound against a surface of the material by M emitting ultrasonic transducers of index i of a multi-element probe, where i is a first natural integer going from 1 to M and where M is a second prescribed natural integer greater than or equal to 3, receiving, at sampling instants $n \cdot T_e$ by M receiving ultrasonic transducers of index j of the multi-element probe, measurement signals x(n, i, j) which are representative of the amplitude of the ultrasounds propagated in the material, where n is a third natural integer going from 1 to N, where N is a fourth prescribed natural integer greater than or equal to 2, where $T_e$ is a prescribed sampling period and where j is a fifth natural integer going from 1 to M, b) forming by a calculator, for at least one prescribed gap Δ, which is positive or zero, a sampling matrix $(A_\Delta)$, having N columns $Y_n$, the N columns $Y_n$, for n going from 1 to N, being formed by all the measurement signals x(n, i, j) and corresponding to the N sampling instants $n \cdot T_e$, each column $Y_n$ having for the sampling instant $n \cdot T_e$ all the measurement signals x(n, i, j) for which a distance between the receiving ultrasonic transducer of index j and the emitting ultrasonic transducer of index i is equal to the prescribed gap Δ, which is identical for the N columns $Y_n$, the sampling matrix $(A_\Delta)$ having rows $X_{i,j}$ formed by the all the measurement signals x(n, i, j), for which the index i is identical in each row $X_{i,j}$ and the index j is identical in each row $X_{i,j}$, the pair i, j being different from one row $X_{i,j}$ to another, c) calculating by the calculator a covariance matrix $(C_\Delta)$ from the sampling matrix $(A_\Delta)$, the covariance matrix $(C_\Delta)$ being a square and symmetrical matrix of dimension N×N, d) calculating by the calculator p eigenvectors $(V_k)$ and p eigenvalues $(\lambda_k)$ associated with the eigenvectors $(V_k)$ for the covariance matrix $(C_\Delta)$, where p is a sixth prescribed natural integer, greater than or equal to 2 and is a prescribed maximum number of calculated eigenvectors $(V_k)$ and of calculated eigenvalues $(\lambda_k)$, less than or equal to N, e) calculating by the calculator projections $X_{i,j}{}^{proj.K}$ of the rows $X_{i,j}$ of the sampling matrix $(A_\Delta)$ on the K eigenvectors $(V_k)$ corresponding to the K largest eigenvalues $(\lambda_k)$, where K is a selected number smaller than the maximum number p of calculated eigenvectors $(V_k)$ and of calculated eigenvalues $(\lambda_k)$, f) subtracting by the calculator from each of the rows $X_{i,j}$ of the sampling matrix $(A_\Delta)$ the projections $X_{i,j}{}^{proj.k}$ of this row $X_{i,j}$ on the K eigenvectors $(V_k)$, to obtain residual defect detection rows $X^*_{i,j}$ formed by a set of residual defect detection measurement signals x*(n, i, j), for which the index i is identical in each residual defect detection row $X^*_{i,j}$ and the index j is identical in each residual defect detection row $X^*_{i,j}$, the pair i, j being different from one residual defect detection row $X^*_{i,j}$ to another, and g) carrying out by the calculator a post-processing for detecting defects in the material from the residual defect detection measurement signals x*(n, i, j), wherein the post-processing for detecting defects comprises an algorithm for focusing on the residual defect detection measurement signals x*(n, i, j) to generate an image.

2. The method according to claim 1, wherein the algorithm for focusing is a focusing algorithm for focusing on every point, the focusing algorithm for focusing on every point comprising a step of calculating by the calculator an indicator I*(w) for probed positions w in a cross-section of the material as follows:

$$I^*(w) = \sum_{i=1}^{M}\sum_{j=1}^{M} x^*(t(w, i, j), i, j)$$

where t(w, i, j) corresponds to a travel time for a signal, which was emitted by the emitting ultrasonic transducer of index i, which was reflected at the probed position w and which was received by the receiving ultrasonic transducer of index j, where t(w, i, j) corresponds to one of the sampling instants $n \cdot T_e$ and where n is calculated between 1 and N, and a step of forming, by the calculator, the image (I*), for which the probed positions w correspond to positions of pixels of the image (I*), the value of the pixels of the image (I*) at the positions w being equal to the indicator I*(w).

3. The method according to claim 1, wherein the focusing algorithm is a focusing algorithm for focusing on every point, the focusing algorithm for focusing on every point comprising a step of calculating by the calculator an indicator I*(w) for probed positions w in a cross-section of the material as follows:

$$I^*(w) = \sum_{i=1}^{M}\sum_{j=1}^{M} g(x^*(t(w, i, j), i, j))$$

where t(w, i, j) corresponds to a travel time for a signal, which was emitted by the emitting ultrasonic transducer of index i, which was reflected at the probed position w and which was received by the receiving ultrasonic transducer of index j, where t(w, i, j) corresponds to one of the sampling instants $n \cdot T_e$ and where n is calculated between 1 and N, and a step of forming, by the calculator, the image (I*), for which the probed positions w correspond to positions of pixels of the image (I*), the value of the pixels of the image (I*) at the positions w being equal to the indicator I*(w) and where g is a prescribed function.

4. The method according to claim 1, further comprising the following step:

h) carrying out by the calculator a bilateral filtering of the image.

5. The method according to claim 1, further comprising calculating by the calculator the integer K, for which $\lambda_K > m + 2s$ and $\lambda_{K+1} \leq m + 2s$, where $(\lambda_k)_{1 \leq k \leq N}$ denotes the eigenvalues for a seventh natural number k going from 1 to N, m is the average of the N eigenvalues $(\lambda_k)_{1 \leq k \leq N}$, s is the standard deviation of the N eigenvalues $(\lambda_k)_{1 \leq k \leq N}$.

6. The method according to claim 1, wherein the M emitting ultrasonic transducers of index i and the M receiving ultrasonic transducers of index j are evenly distributed with respect to the surface of the material.

7. The method according to claim 1, wherein the M emitting ultrasonic transducers of index i form part respectively of M ultrasound emitting-receiving units located in respectively M distinct prescribed positions in the multi-element probe, and the M receiving ultrasonic transducers of index j form part respectively of the M ultrasound emitting-receiving units.

8. The method according to claim 1, wherein the M emitting ultrasonic transducers of index i and the M receiving ultrasonic transducers of index j are distributed in a plane.

9. The method according to claim 1, wherein the M emitting ultrasonic transducers of index i and the M receiving ultrasonic transducers of index j are distributed along at least one rectilinear axis.

10. The method according to claim 1, further comprising calculating by the calculator the residual defect detection measurement signals x*(n, i, j) for several prescribed gaps Δ, which are different from each other.

11. The method according to claim 10, further comprising calculating by the calculator the residual defect detection measurement signals x*(n, i, j) for the prescribed gaps Δ corresponding to all the combinations of the M emitting ultrasonic transducers of indexes i with the M receiving ultrasonic transducers of indexes j.

12. The method according to claim 1, wherein the M emitting ultrasonic transducers of index i of the multi-element probe coincide with the M receiving ultrasonic transducers of index j of the multi-element probe.

13. The method according to claim 1, wherein the M emitting ultrasonic transducers of index i of the multi-element probe are distinct from the M receiving ultrasonic transducers of index j of the multi-element probe.

14. A non-transitory computer-readable medium storing instructions that, when executed by one or more processors, cause the one or more processors to implement the method for detecting defects by ultrasound according to claim 1.

15. A device for detecting, by ultrasound, defects in a material, wherein the device comprises:

a multi-element probe, comprising M emitting ultrasonic transducers of index i, able to successively emit ultrasounds against a surface of the material, where i is a first natural integer going from 1 to M and where M is a second prescribed natural integer greater than or equal to 3, the multi-element probe comprising M receiving ultrasonic transducers of index j, able to receive, at sampling instants $n \cdot T_e$, measurement signals x(n, i, j) which are representative of the amplitude of the ultrasounds propagated in the material, where n is a third natural integer going from 1 to N, where N is a fourth prescribed natural integer greater than or equal to 2, where $T_e$ is a prescribed sampling period and where j is a fifth natural integer going from 1 to M, the device comprising a calculator, which is configured to:
form for at least one prescribed gap Δ, which is positive or zero, a sampling matrix ($A_\Delta$), having N columns $Y_n$, the N columns $Y_n$, for n going from 1 to N, being formed by all the measurement signals x(n, i, j) and corresponding to the N sampling instants $n \cdot T_e$, each column $Y_n$ having for the sampling instant $n \cdot T_e$ all the measurement signals x(n, i, j) for which a distance between the receiving ultrasonic transducer of index j and the emitting ultrasonic transducer of index i is equal to the prescribed gap Δ, which is identical for the N columns $Y_n$, the sampling matrix ($A_A$) having rows $X_{i,j}$ formed by all the measurement signals x(n, i, j), for which the index i is identical in each row $X_{i,j}$ and the index j is identical in each row $X_{i,j}$, the pair i, j being different from one row $X_{i,j}$ to another, calculate a covariance matrix ($C_A$) from the sampling matrix ($A_A$), the covariance matrix ($C_A$) being a square and symmetrical matrix of dimension N×N, calculate p eigenvectors ($V_k$) and p eigenvalues ($\lambda_k$) associated with the eigenvectors ($V_k$) for the covariance matrix ($C_A$), where p is a sixth prescribed natural integer, greater than or equal to 2 and is a prescribed maximum number of calculated eigenvectors ($V_k$) and of calculated eigenvalues ($\lambda_k$), less than or equal to N, calculate projections $X_{i,j}^{proj,k}$ of the rows $X_{i,j}$ of the sampling matrix ($A_A$) on the K eigenvectors ($V_k$) corresponding to the K largest eigenvalues ($\lambda_k$), where K is a selected number smaller than the maximum number p of calculated eigenvectors ($V_k$) and of calculated eigenvalues ($\lambda_k$), subtract from each of the rows $X_{i,j}$ of the sampling matrix ($A_A$) the projections $x_{i,j}^{proj,k}$ of this row $X_{i,j}$ on the K eigenvectors ($V_k$), to obtain residual defect detection rows $X^*_{i,j}$ formed by a set of residual defect detection measurement signals x*(n, i, j), for which the index i is identical in each residual defect detection row $X^*_{i,j}$ and the index j is identical in each residual defect detection row $X^*_{i,j}$, the pair i, j being different from one residual defect detection row $X^*_{i,j}$ to another, and carry out a post-processing for detecting defects in the material from the residual defect detection measurement signals x*(n, i, j), wherein the post-processing for detecting defects comprises an algorithm for focusing on the residual defect detection measurement signals x*(n, i, j) to generate an image.

16. The device according to claim 15, wherein the M emitting ultrasonic transducers of index i of the multi-element probe coincide with the M receiving ultrasonic transducers of index j of the multi-element probe.

17. The device according to claim 15, wherein the M emitting ultrasonic transducers of index i of the multi-element probe are distinct from the M receiving ultrasonic transducers of index j of the multi-element probe.

* * * * *